March 6, 1928.  L. A. SCHOLL  1,661,580
AUTOMOBILE BED
Filed March 25, 1926  2 Sheets-Sheet 1
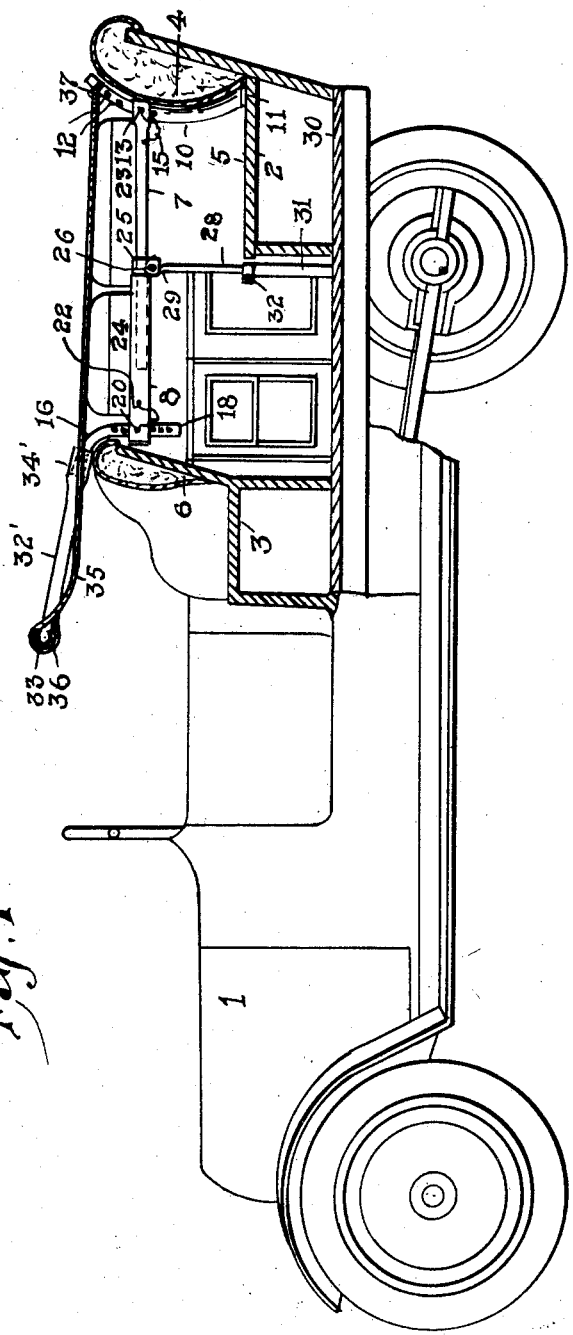
INVENTOR.
Louis A. Scholl
BY F. N. Barber
ATTORNEY.

March 6, 1928.
L. A. SCHOLL
AUTOMOBILE BED
Filed March 25, 1926
1,661,580
2 Sheets-Sheet 2
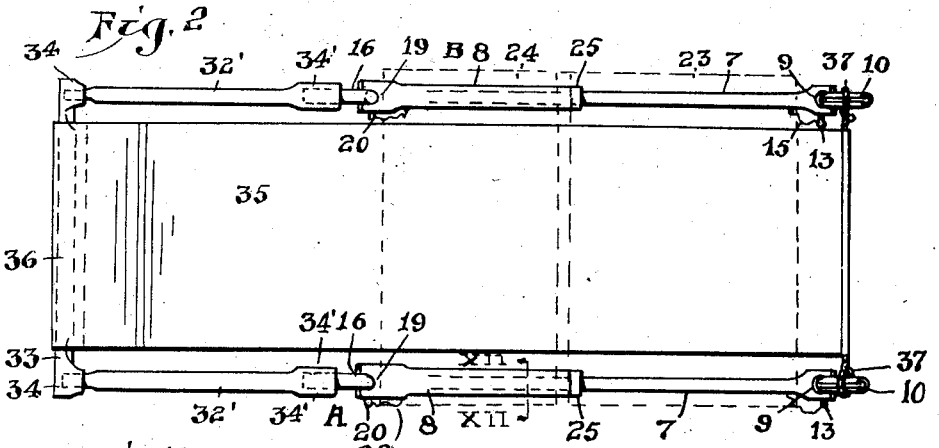
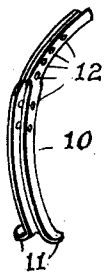
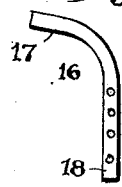
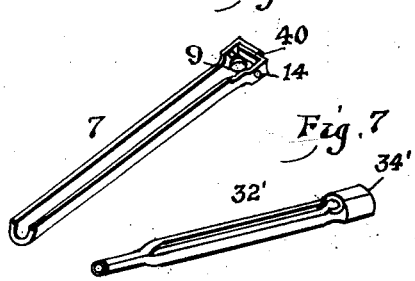
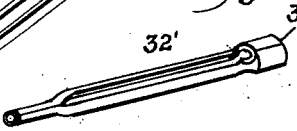
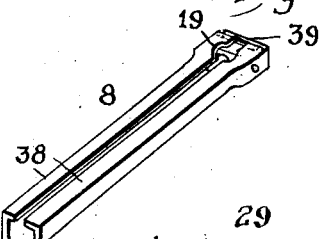
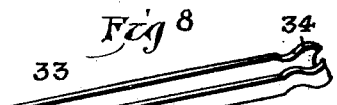
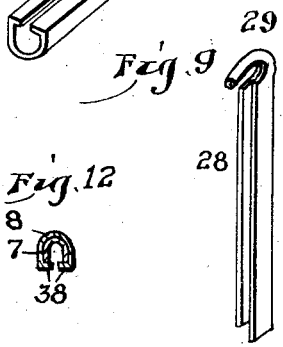
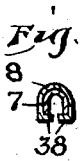
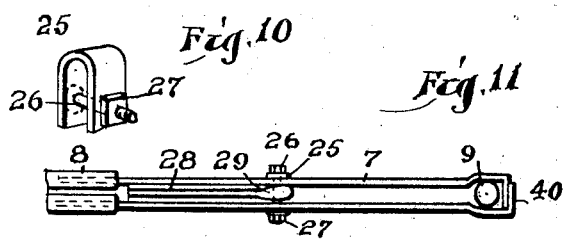
INVENTOR.
Louis A. Scholl
BY F. N. Barber
ATTORNEY Patented Mar. 6, 1928.

1,661,580

UNITED STATES PATENT OFFICE.

LOUIS A. SCHOLL, OF CRAFTON, PENNSYLVANIA.

AUTOMOBILE BED.

Application filed March 25, 1926. Serial No. 97,217.

My invention relates to automobile beds of the knock-down type, composed of elements or units which may upon the disassemblage of the bed be assembled into a short compact light bundle, capable of being carried on the running board or in the tonneau or under the seat of an automobile.

It is one object of this invention to provide an automobile bed frame of which the side bars or rails may be adjusted at either or both ends vertically between the front and back seats, and the said bars or rails may be adjusted longitudinally to correspond with various distances between the front and rear seats. Another object is to provide, for the rear ends of the side bars or rails, uprights or posts resting on the bottom of the seat or rear cushion support and also to provide for the uprights or posts pivotal adjustments whereby their curvature may fit the contour of the upholstered back of the rear seat, or whereby they may by more or less imbedding in the upholstery of the back obtain lateral support for all or nearly all of their length. Another object is to utilize the said side rails as supports for the cushions of the front and rear seats, the cushions forming a mattress for that portion of the bed which is between the seats. Another object is to provide over the front seat forward extensions of the side rails and to stretch a canvas from the front ends of the extension back to the said uprights or posts, the canvas lying on the cushions or constituting a support for the occupants of the bed and for the bed clothing. Another object is to provide removable or foldable supports for the intermediate portions of the side rails. Other objects relate to various details of construction hereinafter described and pointed out in the appended claims.

Referring to the accompanying drawings, Fig. 1 is a side view of an automobile showing my invention in side elevation, parts being in section and broken away; Fig. 2, a top plan view of my improved bed assembled, but detached from the automobile; Fig. 3, a perspective view of one of the uprights or posts for the rear ends of the side rails of the bed frame; Fig. 4, a perspective view of one of the supports for the front ends of the side rails; Fig. 5, a perspective view of one of the rear members of one the side rails, the view showing the lower side of the rail member; Fig. 6, a perspective view of one of the front members of one of the side rails, the view showing the lower side of the rail member; Fig. 7, a view similar in type to Fig. 6, but showing one of the front extensions of one of the bed frames; Fig. 8, a perspective view of the cross-bar connecting the forward ends of the said extensions, the view looking toward the front and somewhat upwardly; Fig. 9, a perspective view of one of the legs for supporting the intermediate portions of the side bars; Fig. 10, a perspective view of one of the clips for limiting telescopic movements of the side rails and legs; Fig. 11, a bottom plan view of a portion of one of the side rails with one of the leg members folded within one of the members of a side rail; and Fig. 12, a section on line XII—XII on Fig. 2.

On the drawings, 1 designates an automobile having the rear seat 2 and front seat 3, the rear seat having the back 4 curved or bowed upwardly and rearwardly and having also the bottom or cushion support 5. 6 designates the back of the front seat.

The bed frame has two side members A and B of identical construction connected at their front ends by a cross-bar. The frame member A will now be described, identical reference numerals being applied to both frame members to designate corresponding parts.

The frame A has a side rail composed of the telescopic members 7 and 8, the former having its forward portion slidable within the rear portion of the latter. The rear or outer end of the member 7 is provided with the eye or opening 9 which receives the upright or post 10 having its lower end resting on the cushion support or seat bottom 5. The post 10 is curved upwardly and rearwardly from its foot or lower end 11 so as to conform substantially to the forward curved surface of the seat back 4. The post has a number of holes 12 adapted to receive a cross-pin or key 13 insertible through holes 14 in the member 7, the pin being connected to the member 7 by a chain or cable 15.

The front support for the side rail is the L-shaped tube or member 16 having its horizontal member 17 resting on the top of the back 6 and its vertical member 18 pendant just back of the back 6. The rail member 8 has the eye or hole 19 to receive the member 18 to which it is secured by the cross-pin or key 20 inserted through the member 8 and one of the holes 21 in the member 18, the pin being attached to the rail member 8 by the chain or cable 22.

The cushions 23 and 24 belonging to the seats 2 and 3 are laid upon the side rails as shown in full lines in Fig. 1 and dotted lines in Fig. 2.

The post 10 is pushed back tightly against the cushion 4 and the support 16 is pushed forwardly so that the member 18 engages the rear face of the seat 3. The post 10 and the support 16 are held as just described by the U-shaped clamp or clip 25 which straddles the member 7 and engages the rear end of the member 8. A bolt 26 is passed through the clip just below the member 7 and a nut 27 is screwed up tightly on the bolt to clamp the clip to the member 7 and thereby prevent the member 7 from sliding further into the member 8.

The side rail may be supported between its ends by the leg 28 having at its upper end the hook 29 looped over the bolt 26. The leg may rest on the floor 30 of the tonneau or other support, and may have the adjustable telescoping extension 31, held in any desired adjustment by the clip 32 constructed like the clip 25 and clamped to the leg 28 at the upper end of the extension. The leg 28 can be folded down into the hollow of the U-shaped member 7 and shoved into the member 8 along with the member 7.

The frame member A is extended forwardly over the front seat from the support 16 by member 32' having its rear end telescoped over the front end of the member 17 of the said support.

The duplicate frame members A and B are spaced as far apart in the automobile as convenient, and the front ends of the extension members are connected together by the cross-bar 33, having at its ends sockets or seats 34 fitting over the ends of the extension members.

A strip of canvas 35 has at its front end the hem 36 which receives the cross-bar 33, the rear end of the canvas being tied by the ropes 37 to the posts 10. The canvas lies on the cushions and forms a support for the bed occupant and the bed clothes.

All of the pieces or members which enter into my improved bed are made of sheet metal as thin as is consistent with their necessary strength. The posts 10 are bent into tubular form above and into U-shape below, the feet 11 being formed from ears integral with the sides of the posts. The rail member 8 is made D-shaped in cross-section and the rail member 7 is U-shaped, so that the edges of the member 7 rest on the inturned flanges 38 on the lower side of the member 8. The front end of the member 8 is expanded laterally and is closed by the ears 39 integral with the sides of the member 8 and turned at right angles thereto so as to overlap across the end of the member 8. The rear end of the member 7 is closed by the ears 40 in the same manner that the front end of the member 8 is closed.

The leg 28 is U-shaped in cross-section, the hook being formed from an extension of the leg. The support 16 is made preferably circular in cross-section. The extension member 32' is made about circular in section at each end, and the cross-bar is U-shaped, but the sides of its ends are pressed together at two points to form the sockets or seats 34.

I claim—

1. In a bed frame for an automobile, a side rail composed of telescopic members, an upright post supporting the rear end of the side rail adapted to be supported at its lower end and curved to approximately the contour of the front surface of the rear seat, a support for the front end of the side rail comprising a horizontal member adapted to rest on the top of the front seat and a pendent member, means for attaching the front end of the side rail selectively at different points on the said pendent member, means for attaching the rear end of the side rail selectively at different points on the said post, and a forward extension carried by the said horizontal member.

2. In a bed frame for an automobile, a side rail composed of telescopic members, an upright post supporting the rear end of the side rail, adapted to be supported at its lower end and curved to approximately the contour of the front surface of the rear seat, a support for the front end of the side rail comprising a horizontal member adapted to rest on the top of the of the front seat and a pendent member, means for attaching the front end of the side rail selectively at different points on the said pendent member, and means for attaching the rear end of the side rail selectively at different points on the said post.

3. In a bed frame for an automobile, a side rail composed of telescopic members, an upright post supporting the rear end of the side rail adapted to be supported at its lower end and curved to approximately the contour of the front surface of the rear seat, a support for the front end of the side rail comprising a horizontal member adapted to rest on the top of the front seat and a pendent member, means for attaching the front end of the side rail selectively at different points on the said pendent member, means for attaching the rear end of the side rail selectively at different points on the said post, and an adjustable clamp gripping the smaller telescopic member and abutting against the end of the larger telescopic member for preventing telescopic movement of the members.

4. In a bed frame for an automobile, a telescopic side rail comprising a member U-shaped in cross-section and slidable within a tubular member, a U-shaped clip astride the U-shaped member, a bolt passed through the ends of the clip for clamping the clip to the U-shaped member, and a leg adapted to be pivotally supported by the bolt and foldable within the U-shaped member.

5. In a bed frame for an automobile, a side rail comprising telescopic members, a U-shaped clip astride the smaller member and abutting against the end of the larger member, a bolt passed through the ends of the clip for clamping the clip to the smaller member, and a leg adapted to be supported by the bolt.

6. In a bed frame for an automobile, a side rail comprising telescopic members, a U-shaped clip astride the smaller member and abutting against the end of the larger member, a bolt passed through the ends of the clip for clamping the clip to the smaller member, and a leg adapted to be supported by the bolt and insertible into the larger member.

In testimony whereof, I hereunto affix my signature.

LOUIS A. SCHOLL.